(No Model.)
J. R. WILSON.
COAL WAGON.
No. 388,801. Patented Aug. 28, 1888.
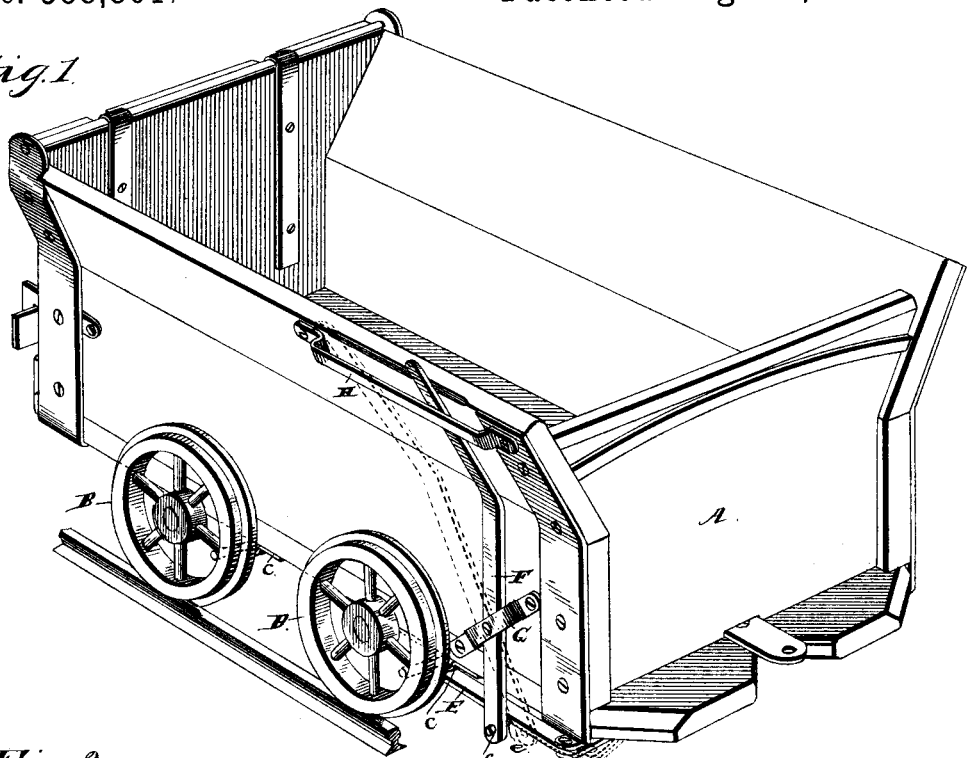
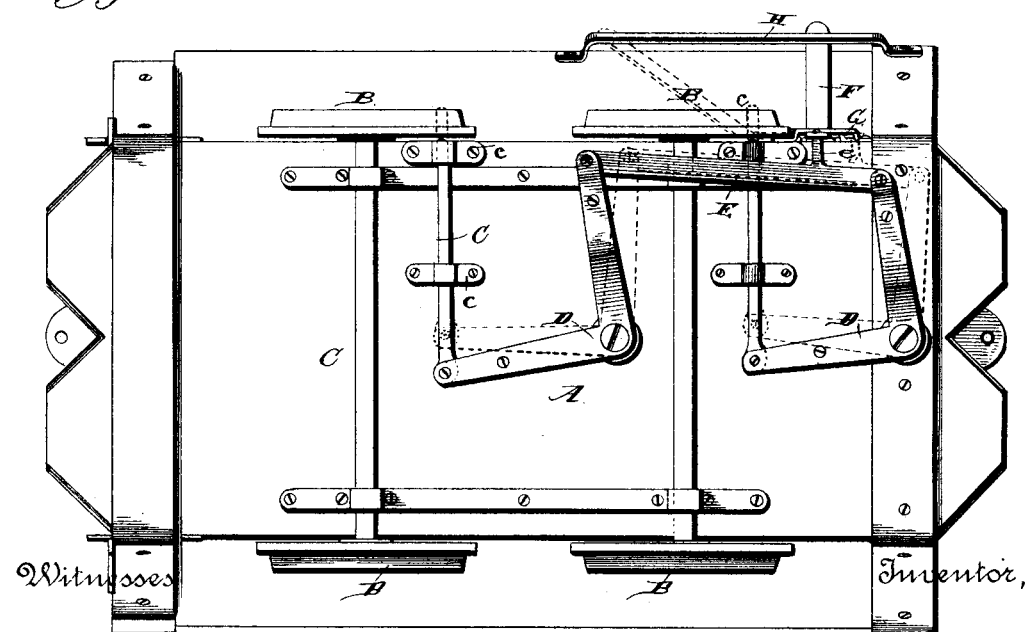
Witnesses Inventor,
John R. Wilson.
By his Attorneys

UNITED STATES PATENT OFFICE.

JOHN R. WILSON, OF GREENSBURG, PENNSYLVANIA.

COAL-WAGON.

SPECIFICATION forming part of Letters Patent No. 388,801, dated August 28, 1888.

Application filed April 17, 1888. Serial No. 270,909. (No model.)

*To all whom it may concern:*

Be it known that I, JOHN R. WILSON, a citizen of the United States, residing at Greensburg, in the county of Westmoreland and State of Pennsylvania, have invented a new and useful Improvement in Coal-Wagons, of which the following is a specification.

The invention relates to improvements in coal-pit wagons on which ordinary brakes having brake-shoes are not effective, the object being to provide means whereby such a wagon will never fail to be stopped when necessary or desirable; and it consists in the construction and novel combination of parts hereinafter described, illustrated in the accompanying drawings, and pointed out in the claims hereto appended.

Figure 1 of the drawings represents a pit-wagon having the device attached, seen from the front. Fig. 2 is a reversed plan view of the same.

Referring to the drawings by letter, A designates the body of a pit-wagon, and B the flanged wheels thereof, turning on the front and rear axles.

C C are sprags resting transversely under the bottom of the wagon and moving in the guide and retaining bearings c, secured to the bottom of the wagon by suitable means and at suitable points, there being preferably two of said bearings for each sprag. The sprags are intended to be simultaneously drawn inward free of the wheels or pushed outward between the spokes by mechanism operated from the top or sides of the wagon. Such a mechanism may be constructed as follows:

D D are angle-levers pivoted at their bends to the bottom of the wagon, the pivots preferably turning in metal bearing plates or blocks secured to the bottom.

The ends of the longitudinal arms of the angle-levers are pivoted to the inner ends of the corresponding sprags, and the ends of the transverse arms thereof are connected by the link-bar E, provided at a suitable point with the outstanding arm e, that projects beyond the adjacent side of the wagon and through an opening, f, in the lower arm of the lever F, near the end thereof. The said lever is pivoted within the head of the bracket G, bolted to the lower part of the side of the wagon, and its upper arm extends above the upper edge of said side and within the bend of the limiting-bracket H, secured longitudinally to the side and adjoining the upper edge of the body. The upper end of the lever is within easy reach of the driver.

It is evident from the above description that when the upper end of the lever F is moved toward the adjacent end of the car the sprags, by means of the link-bar E and angle-levers D, will be drawn inward from the wheels, and when the lever is moved in the opposite direction the sprags will be pushed outward between the spokes of the wheels and will stop the rotation of the latter and cause them to drag. This can be easily done on steep grades, where the application of an ordinary brake would be ineffectual.

By means of the sprags actuated as above described much valuable property, and often lives, may be saved.

Having described my invention, I claim—

1. The combination of the sprags attached transversely at proper points on one side the bottom of a pit-wagon, and mechanism, substantially as described, whereby the said sprags can from a point above or at the side of the wagon be drawn simultaneously outward between the spokes thereof, substantially as specified.

2. The combination of the transverse sprags sliding in bearings secured at proper points along one side of the under surface of the bottom of a pit-wagon, the angle-levers pivoted at their bends to said bottom, and a lever pivoted to the side of the wagon with its upper end rising thereabove, which lever is connected in such manner with said angle-levers as to move them simultaneously in the same direction, substantially as specified.

3. The combination of the transverse sprags C, arranged on one side of the wagon, the guide and retaining bearings c, the angle-levers D, the link-bar E, provided with the outstanding arm e, the pivoted lever F, provided with the engaging opening f near its lower end, and the limiting-staple H, all constructed and arranged substantially as and for the purpose specified.

In testimony that I claim the foregoing as my own I have hereto affixed my signature in presence of two witnesses.

JOHN R. WILSON.

Witnesses:
E. G. SIGGERS,
M. STALNAKER.